US011263839B2

(12) United States Patent
Zhang et al.

(10) Patent No.: US 11,263,839 B2
(45) Date of Patent: Mar. 1, 2022

(54) VEHICLE PERFORMANCE EVALUATION METHOD, DEVICE AND TERMINAL

(71) Applicant: Baidu Online Network Technology (Beijing) Co., Ltd., Beijing (CN)

(72) Inventors: Lizhi Zhang, Beijing (CN); Yunyan Hu, Beijing (CN); Yifeng Pan, Beijing (CN); Rui Liu, Beijing (CN); Ya Wang, Beijing (CN); Qihao Huang, Beijing (CN)

(73) Assignee: Apollo Intelligent Driving (Beijing) Technology Co., Ltd., Beijing (CN)

( * ) Notice: Subject to any disclaimer, the term of this patent is extended or adjusted under 35 U.S.C. 154(b) by 40 days.

(21) Appl. No.: 16/789,181

(22) Filed: Feb. 12, 2020

(65) Prior Publication Data
US 2020/0265659 A1   Aug. 20, 2020

(30) Foreign Application Priority Data
Feb. 20, 2019   (CN) .......................... 201910127175.1

(51) Int. Cl.
*G07C 5/12* (2006.01)
*B60W 40/09* (2012.01)
(Continued)

(52) U.S. Cl.
CPC ............... *G07C 5/12* (2013.01); *B60W 40/09* (2013.01); *B60W 40/11* (2013.01);
(Continued)

(58) Field of Classification Search
CPC ....... G07C 5/12; G07C 5/0841; B60W 40/09; B60W 40/11; B60W 40/114;
(Continued)

(56) References Cited

U.S. PATENT DOCUMENTS

| 9,939,815 B1* | 4/2018 | Silver .................. B60W 30/00 |
| 2003/0158647 A1 | 8/2003 | Katakura et al. |

(Continued)

FOREIGN PATENT DOCUMENTS

| CN | 108241367 A | 7/2018 |
| CN | 108248608 A | 7/2018 |

(Continued)

OTHER PUBLICATIONS

Extended European Search Report in European Patent Application No. 20158436.4, dated Jul. 23, 2020 (7 pages).
(Continued)

*Primary Examiner* — Muhammad Shafi
(74) *Attorney, Agent, or Firm* — Benesch, Friedlander, Coplan & Aronoff LLP

(57) ABSTRACT

A vehicle performance evaluation method, device and terminal are provided. The method includes: acquiring a labeled ADE score of an ADE item within a time period in which the ADE item occurs, and recording labeled data of an ADE index for indicating a vehicle state; acquiring a correlation between the ADE item and the vehicle state, according to the labeled ADE score and the labeled data of the ADE index; acquiring data of a target ADE index within a preset time period, and acquiring a target ADE score according to the data of the target ADE index and a correlation between the ADE item and the vehicle state; and acquiring a vehicle performance evaluation result according to the target ADE score. The passenger participation is not necessary, costs can be reduced and a vehicle evaluation efficiency can be improved.

15 Claims, 4 Drawing Sheets

(51) Int. Cl.
  *B60W 40/11* (2012.01)
  *B60W 40/114* (2012.01)
  *G07C 5/08* (2006.01)
(52) U.S. Cl.
  CPC ......... *B60W 40/114* (2013.01); *G07C 5/0841* (2013.01); *B60W 2540/21* (2020.02)
(58) Field of Classification Search
  CPC ......... B60W 2540/21; B60W 60/0013; B60W 2540/223; B60W 2556/10
  USPC .......................................................... 701/1
  See application file for complete search history.

(56) References Cited

U.S. PATENT DOCUMENTS

| | | | |
|---|---|---|---|
| 2018/0113458 A1 | 4/2018 | Dong et al. | |
| 2018/0365913 A1 | 12/2018 | Nix et al. | |
| 2019/0004516 A1* | 1/2019 | Liu | G05D 1/0088 |
| 2019/0004528 A1* | 1/2019 | Zhan | G06F 9/542 |
| 2019/0004854 A1* | 1/2019 | Yang | G06F 13/26 |
| 2020/0039525 A1 | 2/2020 | Hu et al. | |

FOREIGN PATENT DOCUMENTS

| | | | |
|---|---|---|---|
| CN | 108639061 A | | 10/2018 |
| CN | 109177979 A | | 1/2019 |
| CN | 109242251 A | | 1/2019 |
| DE | 102015210428 | * | 12/2016 |
| DE | 102015210428 A1 | | 12/2016 |
| JP | 2000121506 A | | 4/2000 |
| JP | 2015161587 A | | 9/2015 |
| KR | 2018-033139 | | 4/2018 |
| WO | 2016/198233 A1 | | 12/2016 |

OTHER PUBLICATIONS

First Office Action from The State Intellectual Property Office of People's Republic of China in Chinese Patent Application No. 201910127175.1, dated Jul. 31, 2020 (13 pages).

Search Report issued by The State Intellectual Property Office of People's Republic of China in Chinese Patent Application No. 2019101271751.1, dated Jul. 23, 2020 (4 pages).

Notice of Reasons for Refusal issued by the Japanese Patent Office in Japanese Patent Application No. 2020-024997, dated Jan. 29, 2021 (11 pages).

Notification of Reason for Refusal issued by the Korean Intellectual Property Office in Korean Patent Application No. 10-2020-0020402, dated Dec. 23, 2021 (11 pages).

* cited by examiner

VEHICLE PERFORMANCE EVALUATION METHOD, DEVICE AND TERMINAL

CROSS-REFERENCE TO RELATED APPLICATION

This application claims priority to Chinese Patent Application No. 201910127175.1, filed on Feb. 20, 2019 and entitled "Vehicle Performance Evaluation Method, Device and Terminal", which is hereby incorporated by reference in its entirety.

TECHNICAL FIELD

The present application relates to a field of automatic driving technology, and in particular, to a vehicle performance evaluation method, device and terminal.

BACKGROUND

In the field of automatic driving, in order to evaluate ride experience of a passenger sitting in an automatic driving vehicle, scoring is generally performed according to the ride experience within a certain time period, and the acquired score is called as an auto driving experience (ADE) score. The ADE score may include a score of a forward lean, a pitch, i.e. a forward and backward lean, and a yaw, i.e. a left and right swing. The ADE score can be used to evaluate performance of the automatic vehicle while driving. However, the existing method for acquiring an ADE score by a passenger is not accurate, and collection efficiency thereof is low, thereby leading to a larger error in the performance evaluation for the automatic vehicle during driving.

SUMMARY

A vehicle performance evaluation method, device and a terminal are provided according to embodiments of the present application, so as to at least solve the above technical problems in the existing technology.

According to a first aspect, a vehicle performance evaluation method includes:

acquiring a labeled auto driving experience (ADE) score of an ADE item within a time period in which the ADE item occurs, and recording labeled data of an ADE index for indicating a vehicle state;

acquiring a correlation between the ADE item and the vehicle state, according to the labeled ADE score and the labeled data of the ADE index;

acquiring data of a target ADE index within a preset time period, and acquiring a target ADE score according to the data of the target ADE index and a correlation between the ADE item and the vehicle state; and acquiring a vehicle performance evaluation result according to the target ADE score.

In one implementation, the acquiring a labeled ADE score of an ADE item within a time period in which the ADE item occurs includes:

acquiring a scoring speech for the ADE item within the time period in which the ADE item occurs, and analyzing and labeling the scoring speech to acquire the labeled ADE score corresponding to the ADE item.

In one implementation, the acquiring a correlation between the ADE item and the vehicle state, according to the labeled ADE score and the labeled data of the ADE index includes:

performing statistics to a plurality of labeled ADE scores and labeled data of a plurality of ADE indexes within a preset time period;

calculating a change rate of each ADE index corresponding to the labeled data of the ADE index; and analyzing the change rate of each ADE index and the labeled ADE scores, to acquire a positive correlation between the ADE item and the vehicle state.

In one implementation, the ADE item comprises a forward lean, a yaw and a pitch; and after acquiring a labeled ADE score of an ADE item within a time period in which the ADE item occurs, the method further includes:

acquiring a plurality of forward lean scores, a plurality of yaw scores and a plurality of pitch scores within the time period; and calculating an average of the plurality of forward lean scores; calculating an average of the plurality of yaw scores; and calculating an average of the plurality of pitch scores, and drawing a distribution graph for each of the averages.

According to a second aspect, a vehicle performance evaluation device includes:

a labeled auto driving experience (ADE) score acquiring module configured to acquire a labeled ADE score of an ADE item within a time period in which the ADE item occurs;

an ADE index labeled data recording module configured to record labeled data of an ADE index for indicating a vehicle state;

a correlation calculating module configured to acquire a correlation between the ADE item and the vehicle state, according to the labeled ADE score and the labeled data of the ADE index;

a target ADE index calculating module configured to acquire data of a target ADE index within a preset time period, and acquire a target ADE score according to the data of the target ADE index and a correlation between the ADE item and the vehicle state; and an evaluation result generating module configured to acquire a vehicle performance evaluation result according to the target ADE score.

In one implementation, the labeled ADE score acquiring module includes:

an ADE scoring speech acquiring unit configured to acquire a scoring speech for the ADE item within the time period in which the ADE item occurs; and an ADE scoring speech analyzing unit configured to analyze and label the scoring speech to acquire the labeled ADE score corresponding to the ADE item.

In one implementation, the correlation calculating module includes:

a data statistics unit configured to perform statistics to a plurality of labeled ADE scores and labeled data of a plurality of ADE indexes within a preset time period;

an ADE index change rate calculating unit configured to calculate a change rate of each ADE index corresponding to the labeled data of the ADE index; and a correlation calculating unit configured to analyze the change rate of each ADE index and the labeled ADE scores, to acquire a positive correlation between the ADE item and the vehicle state.

In one implementation, the ADE item comprises a forward lean, a yaw and a pitch, and the device further includes:

an ADE score classifying module configured to acquire a plurality of forward lean scores, a plurality of yaw scores and a plurality of pitch scores within the time period; and an ADE score average calculating module configured to calculate an average of the plurality of forward lean scores;

calculate an average of the plurality of yaw scores; and calculate an average of the plurality of pitch scores, and draw a distribution graph for each of the averages.

In a third aspect, a vehicle performance evaluation terminal is provided according to an embodiment of the present application. The functions may be implemented by hardware, or by hardware executing corresponding software. The hardware or software includes one or more modules corresponding to the above functions.

In a possible embodiment, a structure of the vehicle performance evaluation terminal includes a processor and a storage device, the storage device is configured to store a program for supporting the above vehicle performance evaluation method executed by the vehicle performance evaluation terminal, and the processor is configured to execute the program stored in the storage. The vehicle performance evaluation terminal further includes a communication interface configured for communication between the vehicle performance evaluation terminal and another apparatus or communication network.

In a fourth aspect, a computer-readable storage medium is provided for storing computer software instructions used by the vehicle performance evaluation device, the computer software instructions include programs used by the vehicle performance evaluation terminal in the second aspect, and involved in execution of the above vehicle performance evaluation method.

One of the above technical solutions has the following advantages or beneficial effects.

In the vehicle performance evaluation method provided by the technical solution, an ADE score of an ADE item can be acquired by scoring a speech in a time period in which the ADE item occurs. Further, the score of the ADE item is labeled, and at the same time, labeled data of an ADE index for indicating a vehicle state is recorded. According to the acquired score and the labeled data of the ADE index, a correlation between the ADE item and the vehicle state can be acquired, so that a target ADE score within a preset time period can be directly acquired according to the correlation. In this way a vehicle evaluation result is acquired without passenger participation, costs can be reduced and a vehicle evaluation efficiency can be improved.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

DETAILED DESCRIPTION OF THE EMBODIMENTS

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

Embodiment 1

Figure 1:
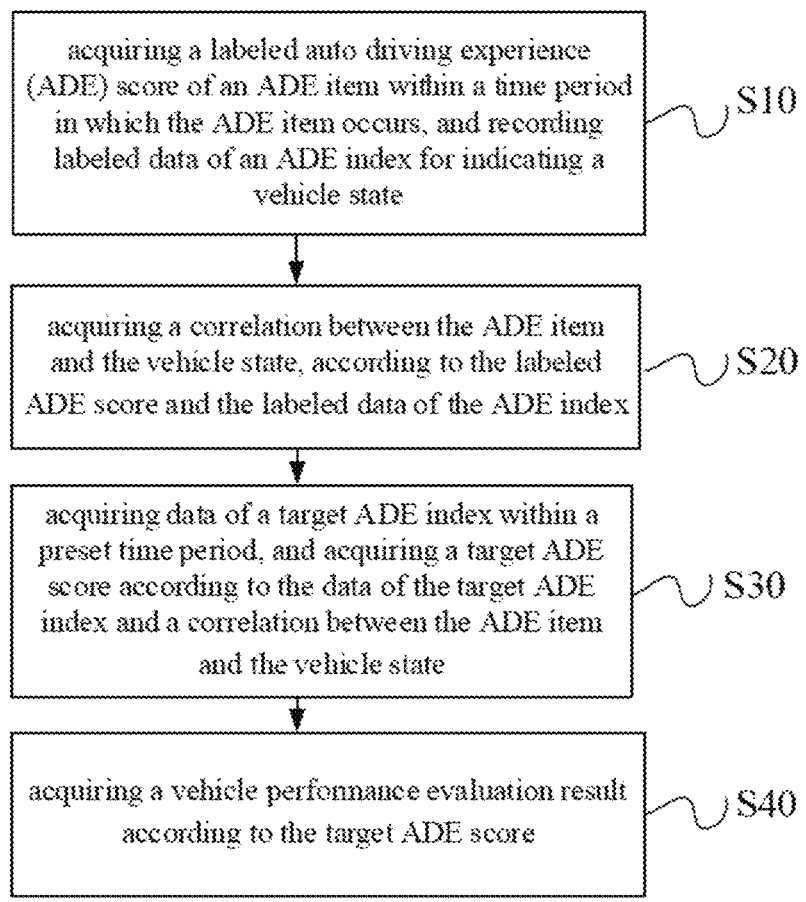
FIG. 1 is a flowchart of a vehicle performance evaluation method according to an embodiment of the present application.

In a specific embodiment, as shown in FIG. 1, a flowchart of a vehicle performance evaluation method is provided, and the method includes the steps of S10 to S40.

S10, acquiring a labeled auto driving experience (ADE) score of an ADE item within a time period in which the ADE item occurs, and recording labeled data of an ADE index for indicating a vehicle state;

S20, acquiring a correlation between the ADE item and the vehicle state, according to the labeled ADE score and the labeled data of the ADE index;

S30, acquiring data of a target ADE index within a preset time period, and acquiring a target ADE score according to the data of the target ADE index and a correlation between the ADE item and the vehicle state;

S40, acquiring a vehicle performance evaluation result according to the target ADE score.

In one example, the ADE item may include multi-dimension ADEs, such as a forward lean, a yaw, and a pitch. The forward lean generally refers to a forward lean of a body due to the inertia during braking. The yaw generally refers to a side-by-side swing of the body when the vehicle turns. The pitch generally refers to multiple forward leans of a body due to the inertia during multiple dramatic changes in speed. In order to fully cover the occurrence time of the ADE item, i.e. the time period in which the ADE item occurs, or in other words, a time period between a time before an item occurs and a time after the item occurs. The ADE score of the ADE item is acquired within this time period. The ADE score of the ADE item can be acquired through manual scoring, for example.

For example, the time period of 20s is acquired. The forward lean, the yaw or the pitch occurs once within 20s, and the ADE score of the ADE item such as the forward lean is recorded as 3. Since the ADE item is affected by the ADE index for indicating the vehicle state, such as a speed, an acceleration, a rotation speed, and a position of a vehicle, the labeled data of the ADE index within 20s is also recorded at the same time. Then, the acquired ADE item, the ADE score of the ADE item, that is, the labeled ADE score of the ADE item and the labeled data of the ADE index are stored in one file. A plurality of the above files in which the labeled data and the labeled ADE score can be acquired and stored, thereby acquiring a correlation between an ADE item and the vehicle state according to the labeled scores and the labeled data. After that, when data of a target ADE index within a preset time period is acquired, the target ADE score of an ADE item can be acquired according to the correlation between the ADE item and the vehicle state. The vehicle performance evaluation result is acquired according to the target ADE score without passenger participation, costs may be reduced and a vehicle evaluation efficiency may be improved.

Figure 2:
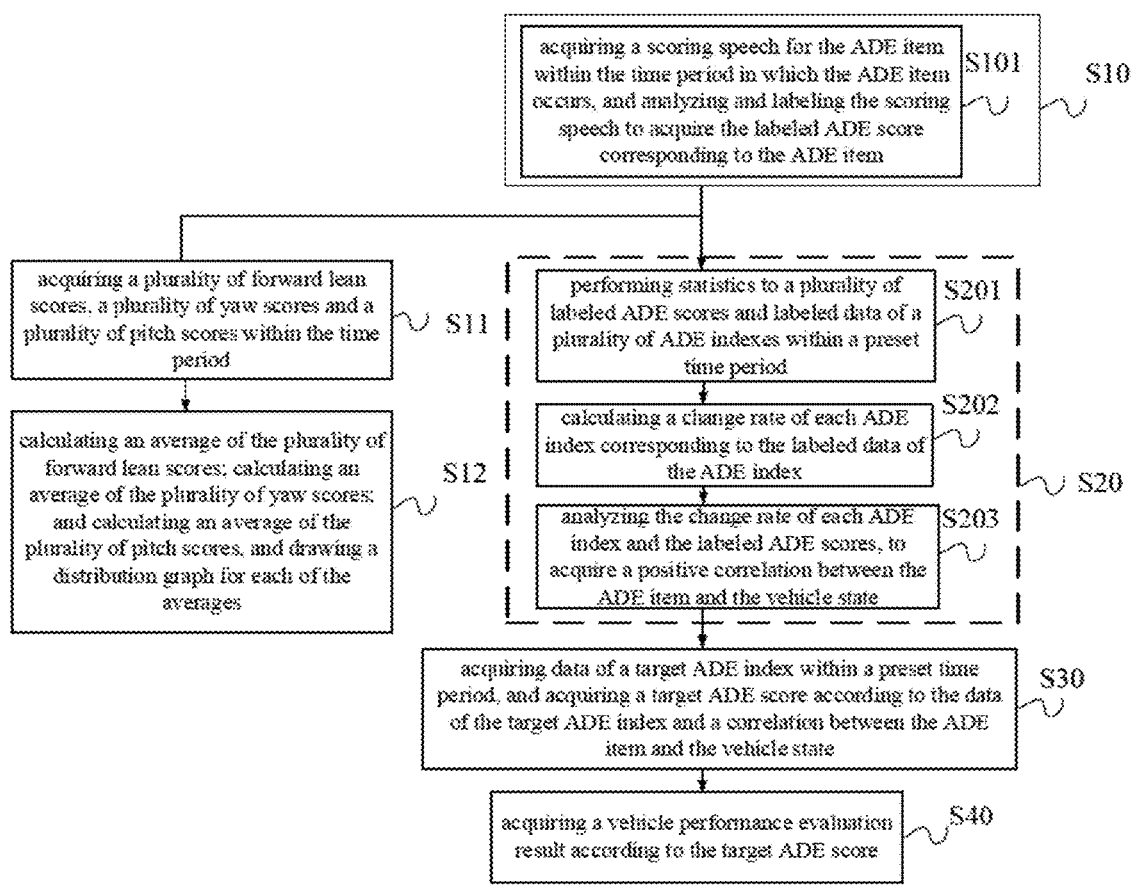
FIG. 2 is a flowchart of another vehicle performance evaluation method according to an embodiment of the present application.

In one embodiment, as shown in FIG. 2, the acquiring a labeled ADE score of an ADE item within a time period in which the ADE item occurs includes:

S101, acquiring a scoring speech for the ADE item within the time period in which the ADE item occurs, and analyzing and labeling the scoring speech to acquire the labeled ADE score corresponding to the ADE item.

In one example, when a user is affected by the ADE item, a scoring speech of the user for the ADE item can be collected by an application in a mobile device such as a mobile phone. For example, the scoring speech for the ADE item is "the yaw, 5", and the speech is analyzed to acquire that the ADE score of the ADE item, i.e. the yaw is 5. Then, the analysis result is manually labeled. For example, the time period and length thereof of an occurrence of the ADE item, the ADE item, such as "yaw" or "forward lean", and the ADE score of the ADE item are recorded. Certainly, there are other ways to acquire the ADE score of the ADE item.

In an embodiment, as shown in FIG. 2, the ADE item may occur a plurality of times in the preset time, and S20 may include steps from S201 to S203.

S201, performing statistics to a plurality of labeled ADE scores and labeled data of a plurality of ADE indexes within a preset time period;

S202, calculating a change rate of each ADE index corresponding to the labeled data of the ADE index; and S203, analyzing the change rate of each ADE index and the labeled ADE scores, to acquire a positive correlation between the ADE item and the vehicle state.

Figure 3:
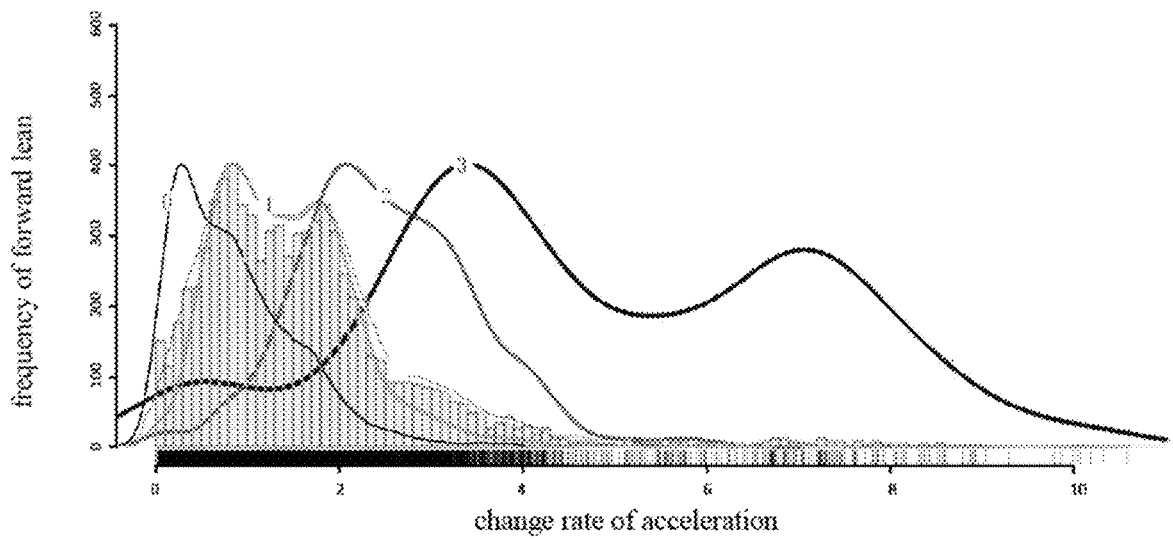
FIG. 3 is a coordinate diagram of an acceleration change rate and a forward lean score according to an embodiment of the present application.

In one example, a correlation between the change rate of the ADE index and the ADE score of the ADE item can directly represent the correlation between the ADE item and the vehicle state. For example, as shown in FIG. 3, by taking the change rate of the acceleration as a horizontal axis and the frequency of the forward lean as the vertical axis, a graph is plotted. It can be seen from the plotted graph that, when the change rate of the acceleration is 3.8, the frequency of forward lean is about 420, and the score of the forward lean is 3 points. In this case, a person is affected by the forward lean strongly and feels uncomfortable. The greater the change rate of the ADE index, the stronger the ADE of the forward tilt affects the user. Similarly, the correlation between the change rate of other ADE index and the ADE item is not repeated herein.

In one embodiment, as shown in FIG. 2, the ADE item comprises a forward lean, a yaw and a pitch; and after acquiring a labeled ADE score of an ADE item within a time period in which the ADE item occurs, the method further includes steps S11 to S12.

S11, acquiring a plurality of forward lean scores, a plurality of yaw scores and a plurality of pitch scores within the time period;

S12, calculating an average of the plurality of forward lean scores; calculating an average of the plurality of yaw scores; and calculating an average of the plurality of pitch scores, and drawing a distribution graph for each of the averages.

Figure 4:
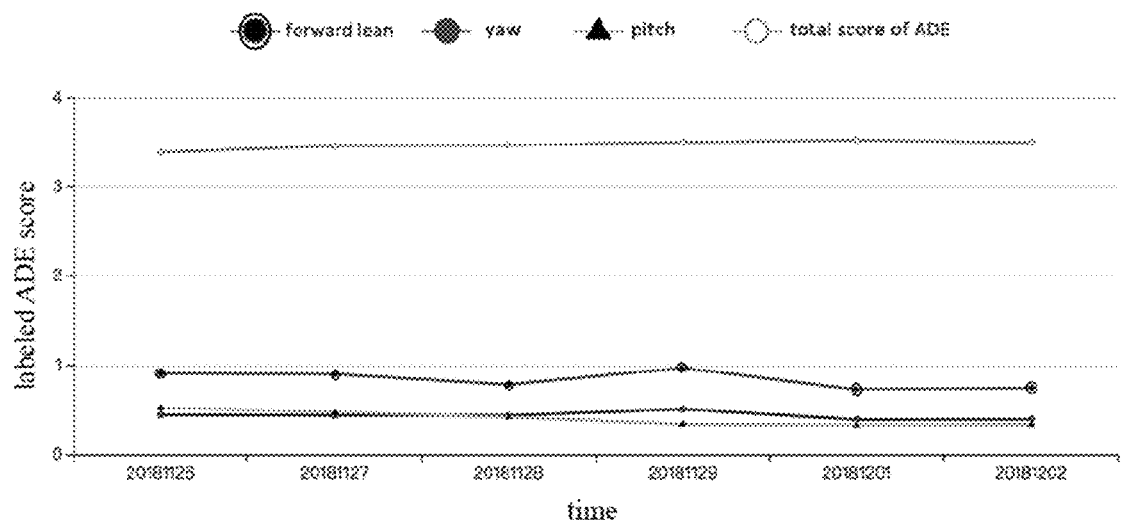
FIG. 4 is a graph showing changes in the labeled ADE score over time according to an embodiment of the present application.

In one example, statistics and analysis are performed on a plurality of labeled ADE scores of the ADE item acquired within a certain time period to facilitate updating the correlation between the ADE item and the vehicle state. According to a time dimension, averaging can be performed on the plurality of forward lean scores, the plurality of yaw scores, and the plurality of pitch score acquired within a certain time period, respectively. For example, as shown in FIG. 4, the averaging may be performed weekly or monthly on the forward lean, the yaw, and the pitch. Then an average curve for the score of the ADE item over time can be plotted. Through a trend of the curve, the change trend of the ADE item of an unmanned vehicle can be acquired. At the same time, a total score of an ADE item can also be acquired weekly and monthly. The total score of the ADE item refers to a total score of the ADE item scored by the user during an unmanned process within a time period. It can be acquired by speech, for example, by a speech "total score of the ADE item, 5 points". The higher the total score of the ADE item, the better the user experience in unmanned vehicle.

Embodiment 2

Figure 5:
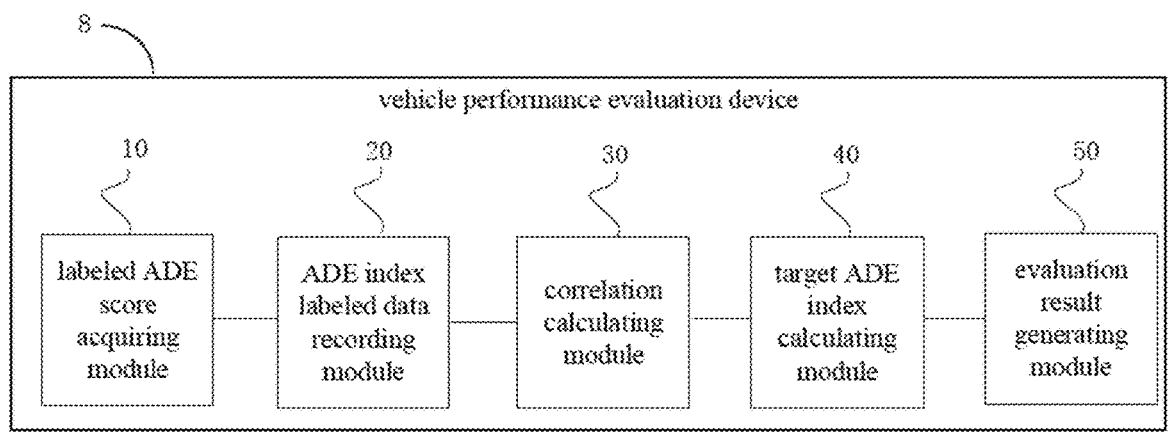
FIG. 5 is a block diagram of a vehicle performance evaluation device according to an embodiment of the present application.

A vehicle performance evaluation device 8 is provided according to another embodiment of the present application, as shown in FIG. 5, including:

a labeled auto driving experience (ADE) score acquiring module 10 configured to acquire a labeled ADE score of an ADE item within a time period in which the ADE item occurs;

an ADE index labeled data recording module 20 configured to record labeled data of an ADE index for indicating a vehicle state;

a correlation calculating module 30 configured to acquire a correlation between the ADE item and the vehicle state, according to the labeled ADE score and the labeled data of the ADE index;

a target ADE index calculating module 40 configured to acquire data of a target ADE index within a preset time period, and acquire a target ADE score according to the data of the target ADE index and a correlation between the ADE item and the vehicle state; and an evaluation result generating module 50 configured to acquire a vehicle performance evaluation result according to the target ADE score.

Figure 6:
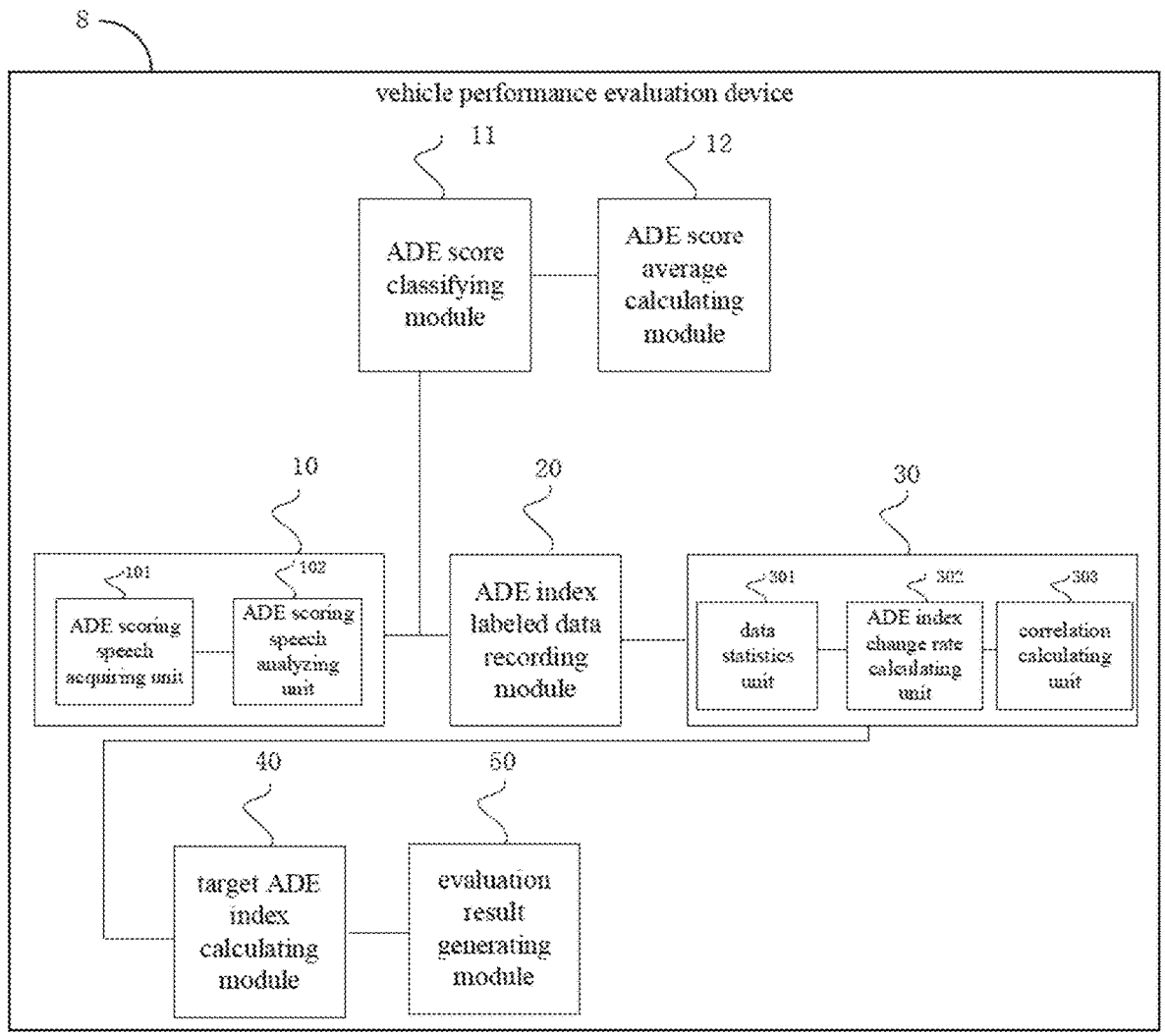
FIG. 6 is a block diagram of another vehicle performance evaluation device according to an embodiment of the present application.

In one implementation, as shown in FIG. 6, the labeled ADE score acquiring module 10 includes:

an ADE scoring speech acquiring unit 101 configured to acquire a scoring speech for the ADE item within the time period in which the ADE item occurs; and an ADE scoring speech analyzing unit 102 configured to analyze and label the scoring speech to acquire the labeled ADE score corresponding to the ADE item.

In one implementation, as shown in FIG. 6, the correlation calculating module 30 includes:

a data statistics unit 301 configured to perform statistics to a plurality of labeled ADE scores and labeled data of a plurality of ADE indexes within a preset time period;

an ADE index change rate calculating unit 302 configured to calculate a change rate of each ADE index corresponding to the labeled data of the ADE index; and a correlation calculating unit 303 configured to analyze the change rate of each ADE index and the labeled ADE scores, to acquire a positive correlation between the ADE item and the vehicle state.

In one implementation, as shown in FIG. 6, the ADE item comprises a forward lean, a yaw and a pitch, and the device further includes:

an ADE score classifying module 11 configured to acquire a plurality of forward lean scores, a plurality of yaw scores and a plurality of pitch scores within the time period; and an ADE score average calculating module 12 configured to calculate an average of the plurality of forward lean scores; calculate an average of the plurality of yaw scores; and calculate an average of the plurality of pitch scores, and draw a distribution graph for each of the averages.

Embodiment 3

Figure 7:
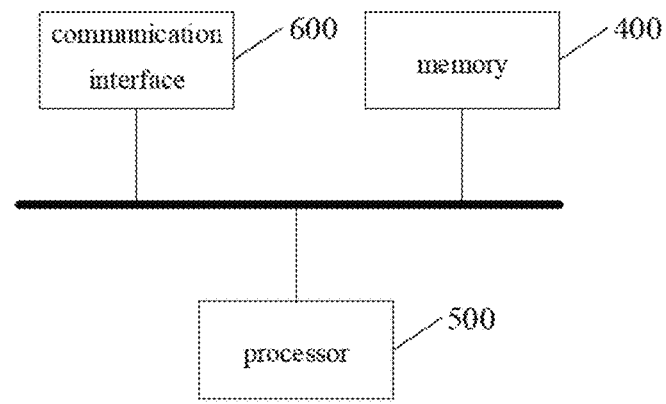
FIG. 7 is a schematic diagram of a vehicle performance evaluation terminal according to an embodiment of the present application.

As shown in FIG. 7, a vehicle performance evaluation terminal is provided in an embodiment of the present application, including a memory 400 and a processor 500. The memory 400 stores a computer program executable on the processor 500. When the processor 500 executes the computer program, the service data promotion method in the foregoing embodiment is implemented. The number of the memory 400 and the processor 500 may be one or more.

The vehicle performance evaluation terminal further includes:

a communication interface 600 configured to communicate with an external device and exchange data.

The memory 400 may include a high-speed RAM memory and may also include a non-volatile memory, such as at least one magnetic disk memory.

If the memory 400, the processor 500, and the communication interface 600 are implemented independently, the memory 400, the processor 500, and the communication interface 600 may be connected to each other through a bus and communicate with one another. The bus may be an Industry Standard Architecture (ISA) bus, a Peripheral Component (PCI) bus, an Extended Industry Standard Component (EISA) bus, or the like. The bus may be divided into an address bus, a data bus, a control bus, and the like. For ease of illustration, only one bold line is shown in FIG. 7, but it does not mean that there is only one bus or one type of bus.

Optionally, in a specific implementation, if the memory 400, the processor 500, and the communication interface 600 are integrated on one chip, the memory 400, the processor 500, and the communication interface 600 may implement mutual communication through an internal interface.

Embodiment 4

According to an embodiment of the present application, a computer-readable storage medium is provided for storing computer software instructions, which include programs involved in execution of the above vehicle performance evaluation method.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A vehicle performance evaluation method, implemented by circuits for implementing functions, comprising:
   acquiring a labeled auto driving experience (ADE) score of an ADE item within a time period in which the ADE item occurs, and recording labeled data of an ADE index for indicating a vehicle state;
   acquiring a correlation between the ADE item and the vehicle state, according to the labeled ADE score and the labeled data of the ADE index;
   acquiring data of an ADE index, as a target ADE index, within a preset time period, and acquiring an ADE score, as a target ADE score, according to the data of the target ADE index and a correlation between the ADE item and the vehicle state; and
   acquiring a vehicle performance evaluation result according to the target ADE score,
   wherein the acquiring a labeled ADE score of an ADE item within a time period in which the ADE item occurs comprises:
   acquiring a scoring speech for the ADE item within the time period in which the ADE item occurs, and analyzing and labeling the scoring speech to acquire the labeled ADE score corresponding to the ADE item.

2. The vehicle performance evaluation method according to claim 1, wherein the acquiring a correlation between the ADE item and the vehicle state, according to the labeled ADE score and the labeled data of the ADE index comprises:
   performing statistics to a plurality of labeled ADE scores and labeled data of a plurality of ADE indexes within a preset time period;
   calculating a change rate of each ADE index corresponding to the labeled data of the ADE index; and
   analyzing the change rate of each ADE index and the labeled ADE scores, to acquire a positive correlation between the ADE item and the vehicle state.

3. The vehicle performance evaluation method according to claim 2, wherein the ADE item comprises a forward lean, a yaw and a pitch; and after acquiring a labeled ADE score of an ADE item within a time period in which the ADE item occurs, the method further comprises:
   acquiring a plurality of forward lean scores, a plurality of yaw scores and a plurality of pitch scores within the time period; and
   calculating an average of the plurality of forward lean scores; calculating an average of the plurality of yaw scores; and calculating an average of the plurality of pitch scores, and drawing a distribution graph for each of the averages.

4. The vehicle performance evaluation method according to claim 1, wherein the ADE item comprises a forward lean, a yaw and a pitch; and after acquiring a labeled ADE score of an ADE item within a time period in which the ADE item occurs, the method further comprises:
   acquiring a plurality of forward lean scores, a plurality of yaw scores and a plurality of pitch scores within the time period; and
   calculating an average of the plurality of forward lean scores; calculating an average of the plurality of yaw scores; and calculating an average of the plurality of pitch scores, and drawing a distribution graph for each of the averages.

5. The vehicle performance evaluation method according to claim 1, wherein the ADE item comprises a forward lean, a yaw and a pitch; and after acquiring a labeled ADE score of an ADE item within a time period in which the ADE item occurs, the method further comprises:
   acquiring a plurality of forward lean scores, a plurality of yaw scores and a plurality of pitch scores within the time period; and
   calculating an average of the plurality of forward lean scores; calculating an average of the plurality of yaw scores; and calculating an average of the plurality of pitch scores, and drawing a distribution graph for each of the averages.

6. A vehicle performance evaluation device, comprising:
   one or more processors; and
   a storage device configured for storing one or more programs, wherein
   the one or more programs are executed by the one or more processors to enable the one or more processors to:
   acquire a labeled ADE score of an ADE item within a time period in which the ADE item occurs;
   record labeled data of an ADE index for indicating a vehicle state;
   acquire a correlation between the ADE item and the vehicle state, according to the labeled ADE score and the labeled data of the ADE index;
   acquire data of an ADE index, as a target ADE index, within a preset time period, and acquire an ADE score, as a target ADE score, according to the data of the target ADE index and a correlation between the ADE item and the vehicle state; and
   acquire a vehicle performance evaluation result according to the target ADE score;
   wherein the one or more programs are executed by the one or more processors to enable the one or more processors further to:
   acquire a scoring speech for the ADE item within the time period in which the ADE item occurs; and
   analyze and label the scoring speech to acquire the labeled ADE score corresponding to the ADE item.

7. The vehicle performance evaluation device according to claim 6, wherein the one or more programs are executed by the one or more processors to enable the one or more processors further to:

perform statistics to a plurality of labeled ADE scores and labeled data of a plurality of ADE indexes within a preset time period;

calculate a change rate of each ADE index corresponding to the labeled data of the ADE index; and analyze the change rate of each ADE index and the labeled ADE scores, to acquire a positive correlation between the ADE item and the vehicle state.

8. The vehicle performance evaluation device according to claim 7, wherein the ADE item comprises a forward lean, a yaw and a pitch, and the one or more programs are executed by the one or more processors to enable the one or more processors further to:

acquire a plurality of forward lean scores, a plurality of yaw scores and a plurality of pitch scores within the time period; and calculate an average of the plurality of forward lean scores; calculate an average of the plurality of yaw scores; and calculate an average of the plurality of pitch scores, and draw a distribution graph for each of the averages.

9. The vehicle performance evaluation device according to claim 6, wherein the ADE item comprises a forward lean, a yaw and a pitch, and the one or more programs are executed by the one or more processors to enable the one or more processors further to:

acquire a plurality of forward lean scores, a plurality of yaw scores and a plurality of pitch scores within the time period; and calculate an average of the plurality of forward lean scores; calculate an average of the plurality of yaw scores; and calculate an average of the plurality of pitch scores, and draw a distribution graph for each of the averages.

10. The vehicle performance evaluation device according to claim 6, wherein the ADE item comprises a forward lean, a yaw and a pitch, and the one or more programs are executed by the one or more processors to enable the one or more processors further to:

acquire a plurality of forward lean scores, a plurality of yaw scores and a plurality of pitch scores within the time period; and calculate an average of the plurality of forward lean scores; calculate an average of the plurality of yaw scores; and calculate an average of the plurality of pitch scores, and draw a distribution graph for each of the averages.

11. A non-transitory computer-readable storage medium, in which a computer executable instructions stored thereon, that when executed by a processor cause the processor to perform operations comprising:

acquiring a labeled auto driving experience (ADE) score of an ADE item within a time period in which the ADE item occurs, and recording labeled data of an ADE index for indicating a vehicle state;

acquiring a correlation between the ADE item and the vehicle state, according to the labeled ADE score and the labeled data of the ADE index;

acquiring data of an ADE index, as a target ADE index, within a preset time period, and acquiring an ADE score, as a target ADE score, according to the data of the target ADE index and a correlation between the ADE item and the vehicle state; and acquiring a vehicle performance evaluation result according to the target ADE score;

wherein the computer executable instructions, when executed by a processor, cause the processor to perform further operations comprising:

acquiring a scoring speech for the ADE item within the time period in which the ADE item occurs, and analyzing and labeling the scoring speech to acquire the labeled ADE score corresponding to the ADE item.

12. The non-transitory computer-readable storage medium of claim 11, wherein the computer executable instructions, when executed by a processor, cause the processor to perform further operations comprising:

performing statistics to a plurality of labeled ADE scores and labeled data of a plurality of ADE indexes within a preset time period;

calculating a change rate of each ADE index corresponding to the labeled data of the ADE index; and analyzing the change rate of each ADE index and the labeled ADE scores, to acquire a positive correlation between the ADE item and the vehicle state.

13. The non-transitory computer-readable storage medium of claim 12, wherein the ADE item comprises a forward lean, a yaw and a pitch; and the computer executable instructions, when executed by a processor, cause the processor to perform further operations comprising:

acquiring a plurality of forward lean scores, a plurality of yaw scores and a plurality of pitch scores within the time period; and calculating an average of the plurality of forward lean scores; calculating an average of the plurality of yaw scores; and calculating an average of the plurality of pitch scores, and drawing a distribution graph for each of the averages.

14. The non-transitory computer-readable storage medium of claim 11, wherein the ADE item comprises a forward lean, a yaw and a pitch; and the computer executable instructions, when executed by a processor, cause the processor to perform further operations comprising:

acquiring a plurality of forward lean scores, a plurality of yaw scores and a plurality of pitch scores within the time period; and calculating an average of the plurality of forward lean scores; calculating an average of the plurality of yaw scores; and calculating an average of the plurality of pitch scores, and drawing a distribution graph for each of the averages.

15. The non-transitory computer-readable storage medium of claim 11, wherein the ADE item comprises a forward lean, a yaw and a pitch; and the computer executable instructions, when executed by a processor, cause the processor to perform further operations comprising:

acquiring a plurality of forward lean scores, a plurality of yaw scores and a plurality of pitch scores within the time period; and calculating an average of the plurality of forward lean scores; calculating an average of the plurality of yaw scores; and calculating an average of the plurality of pitch scores, and drawing a distribution graph for each of the averages.

* * * * *